United States Patent [19]

Richards

[11] Patent Number: 4,697,870
[45] Date of Patent: Oct. 6, 1987

[54] TERMINATION FOR LIGHT-CONDUCTING CABLE

[75] Inventor: John R. Richards, Dresher, Pa.
[73] Assignee: Pilling Co., Fort Washington, Pa.
[21] Appl. No.: 460,762
[22] Filed: Jan. 25, 1983
[51] Int. Cl.⁴ .................................... G02B 6/36
[52] U.S. Cl. .......................... 350/96.20; 350/96.21
[58] Field of Search .................. 350/96.20, 96.23, 96.26

[56] References Cited

U.S. PATENT DOCUMENTS

| | | | |
|---|---|---|---|
| 3,699,950 | 10/1972 | Humphrey, Jr. et al. | 350/96.23 X |
| 3,947,088 | 3/1976 | French | 350/96.20 |
| 3,995,934 | 12/1976 | Nath | 350/96 |
| 4,009,382 | 2/1977 | Nath | 350/96.26 X |
| 4,073,050 | 2/1978 | Kloots | 29/450 |
| 4,082,422 | 4/1978 | Kloots | 350/96.23 |
| 4,181,397 | 1/1980 | Baker et al. | 350/96.23 X |
| 4,184,743 | 1/1980 | Baker et al. | 350/96.26 X |

Primary Examiner—William L. Sikes
Assistant Examiner—Akm E. Ullah
Attorney, Agent, or Firm—Howson and Howson

[57] ABSTRACT

A termination for fiberoptic or liquid-filled light-conducting cables comprises a fitting which extends into the end of the cable sheath, and on which is threaded a ferrule. In one version, the ferrule and fitting have opposed frusto-conical surfaces which pinch the sheath to provide a secure connection between the sheath and the fitting and to prevent the entry of foreign matter into the interior of the cable or the leakage of liquid out of the cable, if liquid-filled. In another version of the invention, the ferrule and fitting have opposed radial walls which compress an auxiliary elastomeric ring. The ring, when compressed, pushes the sheath radially inwardly into a groove in the fitting to provide a secure attachment of the sheath to the fitting and an effective seal of the interior of the cable.

9 Claims, 5 Drawing Figures

TERMINATION FOR LIGHT-CONDUCTING CABLE

BRIEF SUMMARY OF THE INVENTION

This invention relates to flexible light-conducting cable assemblies of the type used in surgery for transmitting light from a remote source to an instrument such as an endoscope or a device such as surgeon's headlight. These light-conducting cable assemblies ordinarily use bundles of light-conducting glass fibers to conduct light. However, some light-conducting cables utilize liquid light-conducting media. This invention is applicable to both types of light-conducting cables.

The invention is particularly concerned with an improved cable termination which overcomes a number of problems which exist in cable terminations heretofore available. The invention is concerned with making a secure connection between the sheath of the cable and the terminating device, with insuring against contamination of the interior of the cable, and with overcoming various problems existing in the manufacture of prior light-conducting cables.

A surgical light-conducting cable assembly typically has fittings at both ends to enable one end to be attached to a light source, and to enable the other end to be attached to an instrument. The principal manufacturers of surgical light sources and lighted instruments include Narco-Pilling, Storz, Welch-Allyn, ACMI, and Wolf. The instruments of each of these manufacturers require a different fitting from the instruments of the other manufacturers. Furthermore, an instrument of one manufacturer is frequently used with a light source of another manufacturer. Thus, there is a need for a wide variety of cable assemblies.

It is desirable to provide a strain reliever at each end of a light-conducting cable, particularly to prevent damage to delicate optical fibers. A typical strain reliever is in the form of a coil of spring metal or rubber boot which extends from the end fitting over the cable sheath for a short distance.

A fiberoptic cable itself comprises a bundle of light-conducting glass fibers extending through an elongated, flexible, tubular elastomeric sheath, and fitting loosely therein. The terminations at both ends of the cable should have appropriate fittings for attachment to a light source and an instrument; should provide for secure attachment of the tubular sheath to the fitting; should provide a seal to prevent the entry of contaminants into the interior of the sheath; and should provide strain relief.

One popular form of cable termination comprises a cylindrical metal element fitting between the sheath and the optical fibers near the end of the sheath, a tight winding of wire about the exterior of the sheath holding the sheath firmly to the cylindrical metal element, a one-piece fitting extending over the wire winding and secured to the wire winding and to the outside of the sheath by an epoxy cement, and a spring extending from the fitting over the sheath for a short distance to provide for strain relief.

Another form of cable termination is described in U.S. Pat. No. 4,073,050 to Jacobus Kloots, dated Feb. 14, 1978. This cable termination comprises a metal insert which extends into the end of the sheath of the cable between the optical fibers and the sheath, and which has an internally threaded section extending outwardly from the end of the sheath. An end fitting is threaded into the internally threaded section. A rubber boot extends over the exterior of the internally threaded section, and over a part of the sheath, and is molded to both elements. Assembly of the device requires placing the end of the cable into a mold after the insert is installed. Normally, the end fittings and the optical fibers are installed after molding takes place.

Still another form of cable termination is described in U.S. Pat. No. 4,082,422, also to Jacobus Kloots, dated Apr. 4, 1978. In this cable termination, an elastomeric strain reliever is provided on the sheath and spaced axially from the end of the sheath, a metal sleeve is adhesively bonded both to the strain reliever and to the sheath, and a plastic housing is press-fit onto the sleeve. The housing has an end with internal threads for receiving a threaded end fitting. As in Kloots U.S. Pat. No. 4,073,050, the strain reliever is molded to the sheath.

In these prior cable terminations, where adhesives are used to secure the end fitting to the sheath, a contamination hazard exists, because sterilization in a steam autoclave can cause the adhesive seal to loosen.

Devices which rely upon adhesive to hold the end fittings to the cable are also likely to come apart after extended usage. The same holds true for devices which rely upon molding of elastomer to metal surfaces to hold parts together.

All of the prior light-conducting cable terminations are time-consuming to assemble. The cables of the Kloots patents require molding of an elastomer strain reliever onto the flexible cable sheath. The requirement for molding gives rise to logistic problems, particularly when the molding process is subcontracted and performed at a location remote from where the rest of the assembly takes place. Since terminations are usually provided at both ends of a cable, it is not possible to cut the cable to length during final assembly. Rather, the length of the cable must be determined before molding of the strain relievers takes place. As a practical matter, this requirement limits the variety of the lengths in which the cable can be supplied, or alternatively requires large inventories of sheaths with molded strain relievers to be maintained. The need for molding strain relievers onto the sheath also causes problems in that any damage at all to a sheath with strain relievers molded onto it which occurs during shipping from the molder to the assembler, requires the entire cable sheath and both strain relievers to be discarded.

The object of the present invention is to overcome one or more of the foregoing problems, and particularly to provide a light-conducting cable assembly which is easy to assemble, and to provide an effective, durable seal, which stands up under constant use, and which is resistant to contamination which may occur in surgery. It is also an object of the invention to provide a light-conducting cable assembly termination in which the parts which require molding are structurally simple and universally usable in any length of cable, and with any end fitting.

It is also an object of the invention to provide a light-conducting cable termination which is capable of being taken apart at any stage during its assembly in order to correct errors or to apply more sealant where needed.

The light-conducting cable assembly in accordance with the invention comprises an elongated, flexible, tubular elastomeric sheath having a light-conducting medium extending longitudinally through the sheath and surrounded thereby. The light-conducting medium can be an optical fiber bundle or a liquid-filled light conductor. At least one end of the sheath is provided with an end fitting, a ferrule, and an elastomeric sleeve. The fitting may be a unitary part, but it has first and second sections. The first section extends into the sheath, and the second section is exteriorly threaded and adjacent to the first section but located beyond the end of the sheath. The fitting has an internal passage receiving the light-conducting medium in such a way that the light-conducting medium extends at least partway into the passage. The first section of the fitting is located between the light-conducting medium and the sheath. The ferrule has internal threads engaged with the exteriorly threaded second section of the fitting. Means operatively associated with the ferrule clamp the sheath of the cable against the first section of the fitting when the ferrule is rotated in one direction on the threaded second section of the fitting. An elastomeric sleeve is bonded to the exterior of the ferrule, and extends from the ferrule over a part of the sheath toward the opposite end of the sheath.

DETAILED DESCRIPTION

Figure 1:
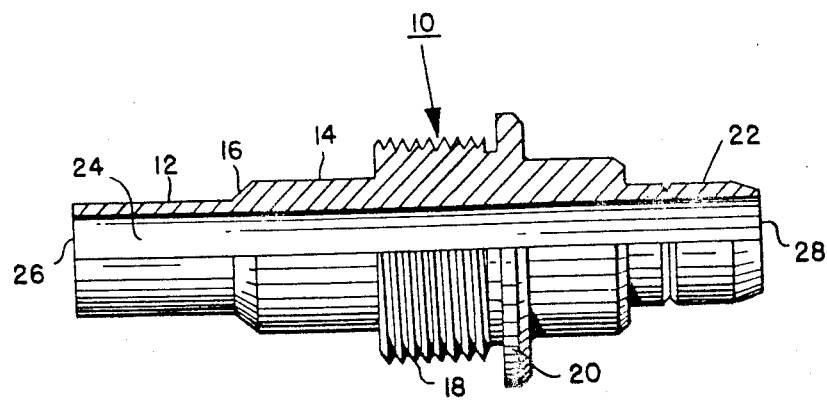
FIG. 1 is an axial half section of the fitting.

Fitting 10, as shown in FIG. 1, comprises a first section having a narrow cylindrical part 12, and a somewhat wider cylindrical part 14 joined by an exterior frusto-conical step 16 at an intermediate location along the length of the first section. The frusto-conical step provides a surface which has a radial component, i.e. the surface extends at least partly in the radial direction with respect to the axis of cylindrical parts 12 and 14. The surface of step 16 faces away from a second section 18 of the fitting, the second section having exterior threads.

On the side of the threads opposite the first section a collar 20 is provided. Collar 20 extends radially outwardly beyond the threads. On the opposite side of collar 20 from section 18 there is provided a third section 22 which includes an end designed to be plugged into an instrument or light source. The end shown is designed for ACMI equipment. The fitting may, of course, be provided with other configurations in its third section 22. However, regardless of the form of the third section, the first and second sections can be as shown in FIG. 1.

The fitting of FIG. 1 has an internal passage 24 which extends from end 26 of the first section to end 28 of the third section at the opposite end of the fitting.

Figure 2:
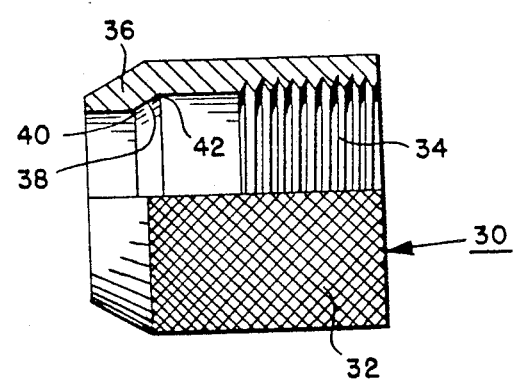
FIG. 2 is an axial half section of the ferrule.

Ferrule 30, shown in FIG. 2, has a knurled generally cylindrical outer surface 32, and internal threads 34 capable of threading onto threads 18 of fitting 10. Threads 34 extend from one end of the ferrule to a location approximately halfway between the ends. At the opposite end of the ferrule, an inwardly extending annular collar 36 is formed. Collar 36 has an internal, frusto-conical surface 38 with its narrow end 40 spaced from threads 34 by a distance greater than the spacing between wide end 42 and the threads. Surface 38, therefore, faces toward the threads.

Figure 3:
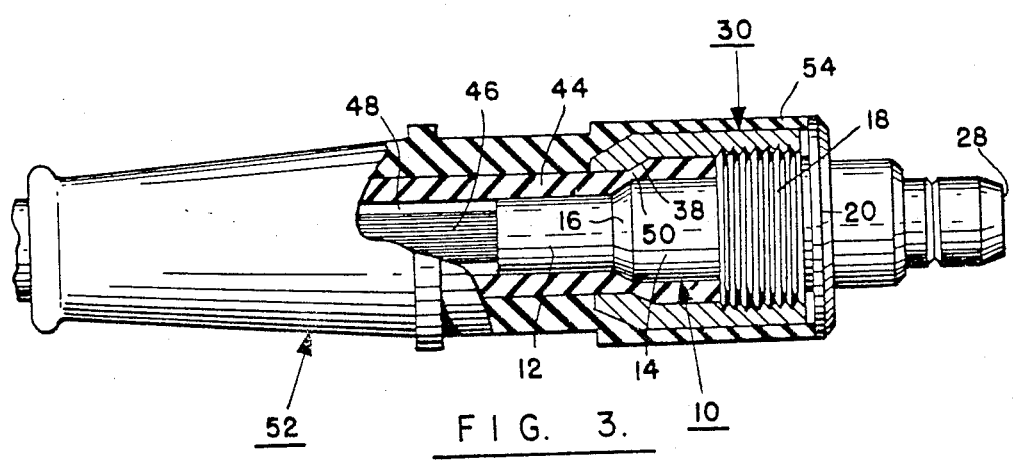
FIG. 3 is a side elevation, partly in axial section, showing the fitting and ferrule in an assembled condition at the end of a fiberoptic cable.

The fitting and ferrule of FIGS. 1 and 2 are shown in assembled condition in FIG. 3 on the end of a fiberoptic cable comprising a sheath 44 and a fiber bundle 46. The fiber bundle fits loosely in the sheath so that a space 48 is provided between the bundle and the sheath when the fibers of the bundle are brought together into a cylinder so that they fit into passage 24 (FIG. 1) in the fitting. The fiber bundle extends to the opposite end 28 of the fitting, where it is secured by a suitable resin such as epoxy resin and polished.

Sheath 44 is an elongated, flexible, tubular elastomeric sheath, the relaxed internal radius of which is approximately the same as that of part 12 of the fitting. The end of the sheath is stretched to fit over part 14 of the fitting. When ferrule 30 is rotated so that the threads cause it to move toward collar 20, part 50 of the sheath is pinched by frusto-conical surfaces 16 and 38. The pinching action not only secures the sheath firmly to the fitting, but also prevents entry of foreign matter into the interior of the sheath. An elastomeric strain relieving boot 52 is molded onto the knurled outer surface of the ferrule, and abuts collar 20 when the ferrule is tightened against the sheath of the fiberoptic cable.

A slow-setting silicone rubber sealant such as "RTV" sealant made by General Electric Company is provided between the strain relieving boot and the sheath, in the threads of the fitting and the ferrule, and also in the space between the ferrule and collar 20. The sealant prevents foreign matter from entering into any space between the sheath and the boot, or into the threads or the space between the ferrule and the collar. However, the sealant is not essential to the prevention of entry of foreign matter into the cable itself, as this is accomplished by the pinching action of the ferrule on the sheath.

In the assembly of a fiberoptic cable having identical terminations at both ends corresponding to that shown in FIG. 3, a combination of a ferrule with an elastomeric boot molded onto it is placed over each end of the sheath, and pushed toward the center of the sheath so that the sheath protrudes through the ferrule. Optical fibers are pulled through the sheath either before or after the ferrules and strain relief boots are placed over the sheath. At this time, the fiber bundle extends beyond both ends of the sheath. At each end of the sheath, the fiber bundle is pushed through the internal passageway of a fitting, and the fitting is pushed into the sheath. The end of the sheath is stretched over wide cylindrical part 14 of the fitting. The sheath is then coated with a silicone rubber sealant from each of its ends to the points where the ends of the boots will be located. Sealant is also placed over the threads of each fitting, and on the side of the collar of each fitting adjacent the threads. The ferrules are then threaded onto the threads of the fitting until the sheath is pinched and secured in place. Following this, a low viscosity epoxy resin is applied to the fibers protruding through the fittings, and the fibers are then cut and polished.

The cable just described has the advantages of easy assembly. It provides a strong and secure attachment of the cable sheath to the end fitting, and an effective, durable seal which prevents entry of contaminants into the interior of the cable, and which stands up under constant use. The molded combination of the ferrule and the strain relief boot can be used with any of a variety of fittings, as all fittings can have standard first sections (12, 14) and standard second sections (18).

The use of slow-setting sealant on the sheath and in the threads and the fact that neither molding nor adhesive is depended upon to secure the sheath and fitting together, make it possible to take the cable termination apart at any stage during its assembly to correct errors or to apply more sealant where needed. Thus, it is not necessary to discard an entire cable assembly when an error is made in putting it together.

Figure 4:
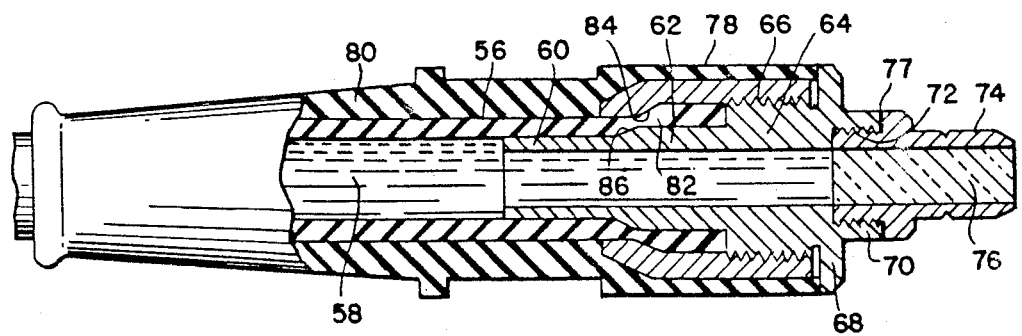
FIG. 4 is a side elevation, partly in axial section of a modified cable termination in accordance with the invention used with a liquid-filled light-conducting cable.

A device similar to that shown in FIG. 3 can be used as a termination for a liquid-filled light-conducting cable. Such a device is shown in FIG. 4. The liquid-filled cable comprises a tubular flexible sheath 56 filled with an optically transparent liquid 58. The material of the sheath, or at least the inside coating thereof, and the liquid, must be chosen for accomplishing light transmission. Techniques for accomplishing light transmission through liquid-filled flexible cables are well developed, and exemplified by U.S. Pat. No. 3,995,934, dated Dec. 7, 1976. The disclosure of the patent is here incorporated by reference. Ordinarily, the liquid and sheath material are chosen so that the index of refraction of the liquid is higher than the index of refraction of the sheath. This relationship produces internal reflections which enable the liquid-filled tube to transmit light from one end to the other regardless of how it is bent. Glycerin is a typical liquid, and polytetrafluoroethylene and polytetrafluoroethylene hexafluoropropylene are typical sheath materials.

The fitting is similar to that shown in FIG. 1, except that it comprises two parts threaded together. The fitting has a first section comprising cylindrical parts 60 and 62, part 62 being radially larger than the relaxed internal radius of the sheath. The fitting has a second section 64 with external threads 66, a collar 68, a protruding part 70 having internal threads 72, and a separate third section 74 threaded into part 70. Section 74 has a cylindrical passage with a quartz window 76 cemented into it. Liquid 58 fills the sheath and the internal passage of the first and second sections of fitting 68. It is prevented from flowing outwardly by the quartz window in section 74. A sealing gasket is provided at 77.

Ferrule 78 is identical to the ferrule shown in FIG. 2, and has a strain relief boot 80 molded to its knurled exterior. Part 82 of the sheath is pinched between surface 84 of the ferrule and surface 86 of the fitting in the same manner as is part 50 of the sheath in FIG. 3.

The seal provided by the pinching action of the ferrule against the flexible sheath is particularly advantageous in the case of a liquid-filled sheath, because it not only secures the sheath firmly to the fitting and prevents the entry of foreign matter, but also effectively prevents the leakage of liquid from the interior of the sheath.

The light-conducting cable in accordance with the invention can be assembled by first securing end fittings at both ends of the sheath. The section corresponding to section 74 of FIG. 4 is present at one end of the cable, but not at the other. Thus, one end of the cable is open. The light-conducting liquid is poured into the cable through the open end. The cable is vibrated slightly to dislodge air bubbles adhering to the wall of the sheath. When the cable is filled to the end, and bubbles have been eliminated, the section with the quartz window is threaded into the end of the open fitting. A small amount of liquid is displaced at this time. When the section having the quartz window is securely tightened, it provides a permanent, leak-proof seal. The cable may then be used in the same manner as the fiberoptic cable of FIG. 3.

Figure 5:
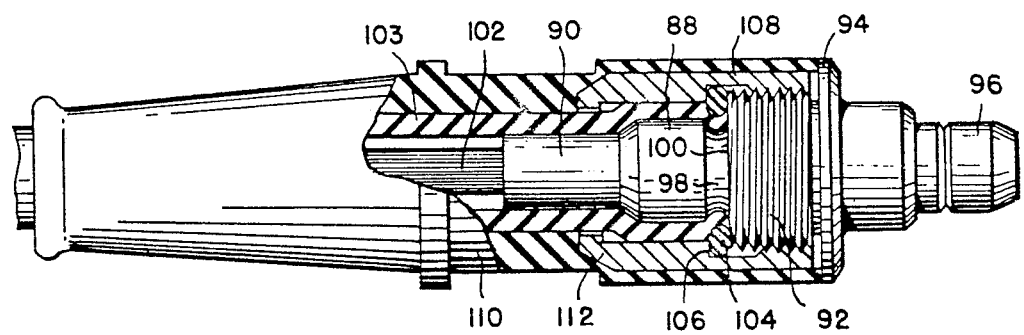
FIG. 5 is a side elevation, partly in axial section, showing a modified termination for a fiberoptic cable.

The devices of FIGS. 3 and 4 secure the flexible sheath to the end fitting by directly pinching the sheath between frusto-conical surfaces of the end fitting and the ferrule. An alternative scheme, applicable both to fiber cables and to liquid-filled cables is illustrated in FIG. 5. The fitting in FIG. 5 is similar to that in FIG. 1, in that it comprises a first section having larger and smaller cylindrical parts 88 and 90, a second section 92 having external threads, and a third section 96 which can be plugged into a light source or an instrument. The fitting differs from the fitting of FIG. 1 in that a groove 98 is provided at the location where the first and second sections come together. The threaded section preferably has a radially extending surface 100 forming one side of the groove.

Fiber bundle 102 extends through an internal passage in the fitting, and terminates at the far end of section 96. Flexible sheath 103 extends over parts 90 and 88 of the first section, and is stretched over part 88. The end of the sheath is pushed into groove 98 by an elastomeric ring 104 compressed between radial wall 100 of the fitting, and radial wall 106 of ferrule 108. The normal relaxed internal radius of ring 104 is approximately equal to the external radius of part 88. However, axial compression of ring 104 between walls 100 and 106 causes part of the ring to expand inwardly, pushing the end of sheath 103 into groove 98, where it is firmly secured.

A boot 110 is molded to the knurled exterior of ferrule 108, and extends rearwardly from the ferrule over part of the sheath. Collar 112 of the ferrule does not pinch the sheath, and the sheath is held in place by virtue of its being compressed into groove 98 by ring 104.

As a modification to the device of FIG. 5, it is possible to eliminate the groove, and to rely solely on friction between a ring corresponding to ring 104 and the exterior of the sheath. However, the groove provides a particularly secure attachment between the sheath and the fitting.

In the versions of the cable termination shown in FIGS. 4 and 5, a sealant is used between the strain relief boot and the sheath, in the threads of the end fitting and ferrule, and in the space between the ferrule and the collar of the fitting.

The terminations shown in FIGS. 3, 4 and 5 can be made with any of a wide variety of cable connector configurations simply by modifying one end of the end fitting. In fact, in the case of FIG. 4, the first and second sections of the fitting can be a standard unit, and only the third section with the quartz window cemented in place, need be changed to provide a different connector configuration.

I claim:

1. In a light-conducting cable assembly comprising an elongated flexible, tubular elastomeric sheath having a light-conducting medium extending longitudinally through said sheath and surrounded thereby, an end termination at one end of the sheath comprising:

a fitting having a first section extending into the sheath at one end thereof, an exteriorly threaded second section adjacent to said first section but located beyond said one end of the sheath, and an internal passage receiving the light-conducting medium whereby the light-conducting medium extends at least part way into the internal passage and said first section of the fitting is located between the light-conducting medium and the sheath;

a ferrule having internal threads engaged with said exteriorly threaded second section and means operatively associated with the ferrule for clamping the sheath against the first section when said ferrule is rotated in one direction on said threaded second section; and an elastomeric sleeve bonded to the exterior of said ferrule and extending therefrom over a part of said sheath toward the opposite end of the sheath.

2. A light-conducting cable assembly according to claim 1 having a sealant between said sleeve and said sheath.

3. A light-conducting cable assembly according to claim 1 in which at least part of said first section is radially larger than the relaxed internal radius of the tubular sheath and maintains the part of the sheath surrounding it in a radially stretched condition, and the end of said part of the first section remote from the exteriorly threaded second section is formed into a surface which has a radial component and faces away from said exteriorly threaded section, the means on said ferrule for clamping said sheath against said first section comprising an inwardly extending annular collar having a surface bearing against said sheath and clamping said sheath against said surface with a radial component on said first section.

4. A light-conducting cable assembly according to claim 3 in which said surface having a radial component is an exterior frusto-conical step at an intermediate location along the length of said first section.

5. A light-conducting cable assembly according to claim 4 in which said surface of the inwardly extending annular collar is an internal frusto-conical surface the narrower end of which is more remote from the threaded section than is the wider end.

6. A light-conducting cable assembly according to claim 1 in which said means operatively associated with the ferrule for clamping the sheath against the first section of the fitting comprises an elastomeric ring at least partially surrounding the sheath, opposed means on the ferrule and on the fitting for compressing the ring axially when the ferrule is rotated in said one direction on said threaded second section whereby, as a result of said axial compression, the elastomeric ring expands radially inwardly to clamp the sheath against the first section of the fitting.

7. A light-conducting cable assembly according to claim 6 in which said first section of the fitting is provided with an external annular groove positioned at the axial location of the ring whereby radial inward expansion of the ring forces the sheath into the groove.

8. A light-conducting cable assembly according to claim 1 in which the light-conducting medium is a liquid.

9. A light-conducting cable assembly according to claim 8 in which the fitting includes a third section threaded into the second section thereof, the third section having a transparent window permitting light to pass between the liquid light-conducting medium and the exterior of the fitting.

* * * * *